Oct. 2, 1951

B. D. LEE 2,569,818

DYNAMIC LUBRICATION OF MECHANICAL LINKAGES
EMPLOYED IN ELECTRICAL ANALOGUE

Filed March 2, 1948

INVENTOR.
BURTON D. LEE

BY
Daniel Stryker

ATTORNEY

Oct. 2, 1951     B. D. LEE     2,569,818
DYNAMIC LUBRICATION OF MECHANICAL LINKAGES
EMPLOYED IN ELECTRICAL ANALOGUE
Filed March 2, 1948     3 Sheets-Sheet 2
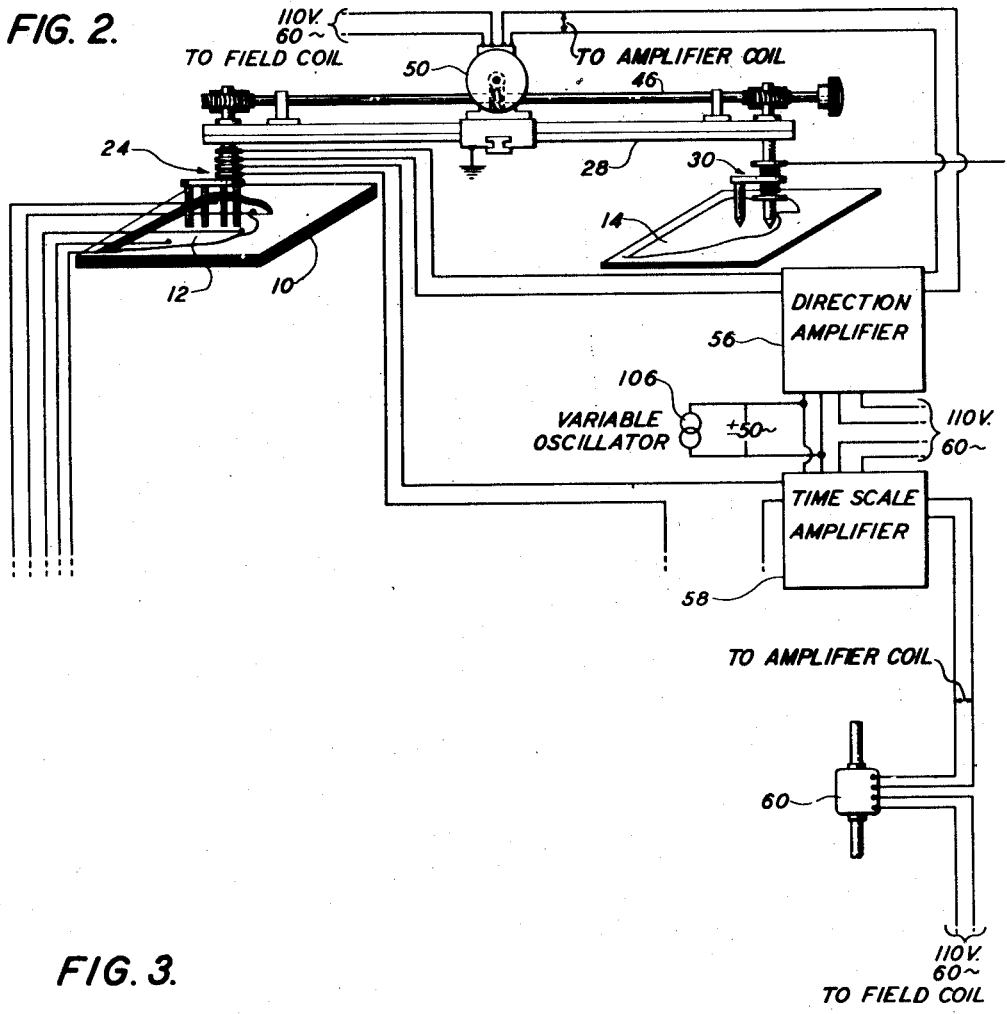
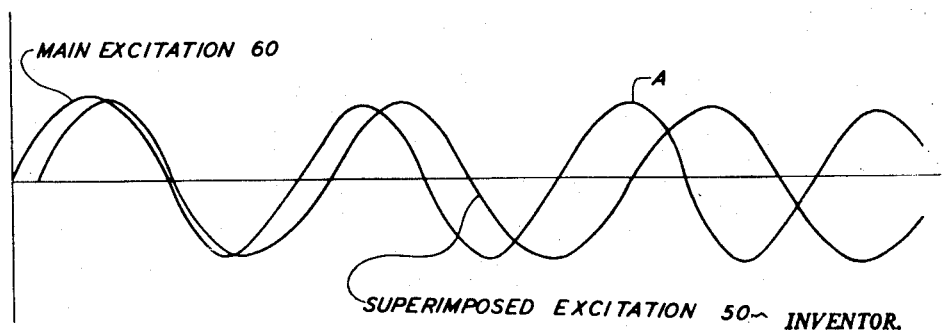
INVENTOR.
BURTON D. LEE
BY
*Daniel Stryker*
ATTORNEY Patented Oct. 2, 1951

2,569,818

UNITED STATES PATENT OFFICE 2,569,818

DYNAMIC LUBRICATION OF MECHANICAL LINKAGES EMPLOYED IN ELECTRICAL ANALOGUES

Burton D. Lee, Houston, Tex., assignor to The Texas Company, New York, N. Y., a corporation of Delaware Application March 2, 1948, Serial No. 12,669

8 Claims. (Cl. 318—28)

This invention is concerned with the dynamic lubrication of mechanical linkages, particularly those employed in electrical analogues used for the study of steady-state systems. The invention provides improvements to the end that the sensitivity of apparatus employing such linkages is increased, but is applicable to any servo-mechanism employing a multiple-winding induction motor to drive a compensating means in either direction to null position.

It has been proposed heretofore to employ potentiometric models in the analysis of mechanical, electrical and hydraulic systems which obey, at least approximately, Laplace's equation. Thus, as disclosed in co-pending application Serial No. 791,796, filed December 15, 1947, by Alexander Wolf and Burton D. Lee, in co-pending application Serial No. 791,797, filed December 15, 1947, by Alexander Wolf and in co-pending application Serial No. 788,989, filed December 1, 1947, by Burton D. Lee, it is possible to solve a number of problems, such as the progress of a wet gas-dry gas interface in a recycling operation in a wet gas field by means of a potentiometric model. The solution of such problems is, as disclosed in these co-pending applications, greatly facilitated by employing a mechanical linkage, such for example, as a pantograph, which moves one or more tracer points on a chart to correspond to the movement of corresponding probing electrodes on the potentiometric model.

A preferred form of the above described apparatus employs a three-dimensional model having a basin corresponding in shape to the system undergoing investigation. The basin is filled with a pool of a suitable electrolyte, and potentials corresponding to forces acting upon the systems are impressed across the pool. A probe head provided with multiple probing electrodes is disposed above the pool with the electrodes in contact therewith. Adjacent the model there is a chart and a marker head provided with a plurality of tracer points is disposed above the chart. A mechanical linkage is provided for moving the marker head and the probe head in unison to corresponding positions on the chart and the pool respectively and also for rotating the two heads through corresponding angles.

In one application of such an apparatus, namely the determination of the progress of the "invasion front" of dry gas being pumped into a wet gas field in a recycling operation, the exploring probe preferably has three or more probing electrodes at least two of which are adapted to locate points of equal potential in the pool. The individual probing electrodes are electrically connected to potentiometer-galvanometer circuits in such a manner that the potentials between individual probing electrodes may be determined. The multitype electrode exploring probe is mechanically supported in such fashion that the probing electrodes are free to rotate as a unit in a plane parallel to the upper surface of the electrolyte pool and have sufficient freedom of motion to permit the probing electrodes to explore any desired portion of the pool.

The probe support is constructed to transmit the movement of the probe to the marker head or mapping device. A linkage is also provided in association with the mechanical support so as to cause simultaneous rotation of the probe and the marker head or mapping device.

The operation of the instrument may be carried out either manually or automatically through the medium of electrical energization, or in particular applications any step or steps may be carried out manually and the other steps automatically. For automatic operation means are provided for adjustment of the multi-electrode exploring probe so that the equipotential probing electrodes seek and locate lines of equal potential. Simultaneously the positions of opposed current line probes with respect to the conducting pool are recorded on the chart by the mapping device.

Means may also be provided for automatically determining the transit time required for progress of the fluid interface (invasion front) along these current flow lines when studying hydraulic systems (or of the potential gradient along the current flow lines when studying electrical systems). This means comprises a balancing circuit which serves to balance a standard voltage against the potential between the current line electrodes by means of a variable resistance.

The present invention is directed to improvements in the means for automatically moving the probe and the mapping device, and in its preferred form includes a pair of induction motors dependent for their operation upon voltage differentials between the corresponding probing electrodes.

The electrodes of the exploring probe are generally arranged in pairs, the electrodes of each pair being spaced from each other and connected to the input of an amplifier. One pair of the probing electrodes designated "equipotential electrodes" is connected to the input of an amplifier, the output of which is connected across the amplifier coil of a first induction motor. This motor is mechanically coupled to the above described linkage which controls the rotation of the probe head and mapping device. By means of this linkage the motor causes the equipotential electrodes to seek points of equal potential.

A second pair of electrodes, designated "flow line electrodes" are spaced from each other on the probe head on a line normal to the line of the equipotential electrodes. The flow line electrodes define the direction of current flow which is recorded by the mapping device. To automatically determine the potential gradient between the flow line electrodes they are connected through the above described balancing circuit to an amplifier. The output of this amplifier is fed to the amplifier coil of a second induction motor which is mechanically linked to the variable resistance in the balancing circuit. Through this linkage the motor causes the control arm of the variable resistance to seek the point at which the balancing circuit is in balance. This point is determined by reading the adjusted setting of the variable resistance and represents the potential gradient between the flow line electrodes.

Electric motors and mechanical linkages have a comparatively large bearing friction which, I have found, interferes with the speed of operation and the sensitivity of the analyzing apparatus. The fact that the motors are intermittently operated serves to multiply the deleterious effects of the starting friction on the over-all operation.

The disadvantageous effects of this starting friction in apparatus of the class described above, and in fact in any servo-mechanism employing a multiple-winding induction motor to drive a compensating means in either direction to null position may be overcome in accordance with my invention by incorporating in the system means for supplying current of a given line frequency to the multiple windings and means for superimposing on the current supplied to less than all of the windings a current having a different frequency. The invention is applicable to servo-mechanisms with split-phase motors. Preferably, the off-frequency current is applied to other than the main winding.

To consider the application of the invention to the servo-mechanism incorporated in the potentiometric models described above, the motor of the apparatus preferably is provided with field coils and amplifier coils. I accomplish "dynamic lubrication" of the motors by superimposing upon the current supplied to the amplifier coils another having a different frequency. The pull of the motor remains unaltered, but the superposition of the different frequency causes a continual, slight oscillation back and forth across the average balanced position. The improved accuracy is a consequence of the substantially continuous motion of the probing electrodes which eliminates errors which might otherwise result from mechanical lag between the motor operation and the electrodes.

The invention may be more clearly understood from the following detailed description of a preferred example, taken with reference to the accompanying drawing in which:

Fig. 2 is a diagram of a portion of the system of Fig. 1 showing another means of accomplishing dynamic lubrication;

Fig. 3 is a graph illustrating the interaction of the currents supplied to the amplifier coil of an induction motor employed in the apparatus of Figs. 1 or 2.

Figure 4:
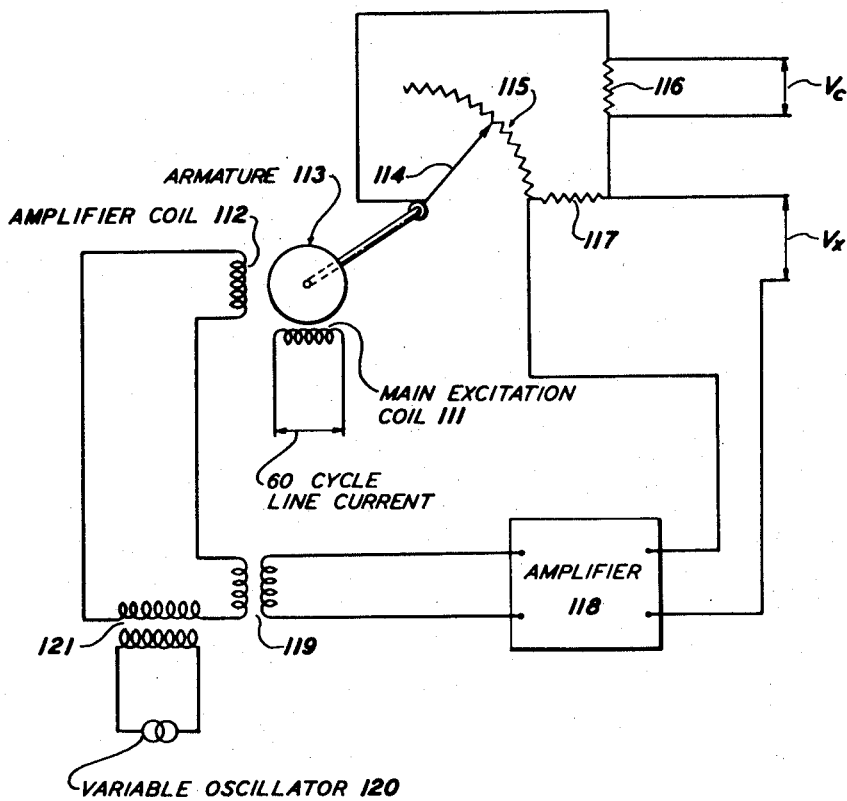
Fig. 4 is a wiring diagram of a servo-mechanism employing a multiple-winding induction motor to drive a compensating means in either direction to null position.

In Fig. 4, a multiple-winding induction motor is shown with a main excitation or field coil 111, an amplifier coil 112, and an armature 113 in inductive relationship with both coils. The main excitation coil is energized with line current having a frequency of say 60 cycles. The motor is incorporated in a servo-mechanism and a slider 114 of a variable resistance 115 is fastened rigidly to the shaft of the motor and rotates therewith. The variable resistance acts as the compensating means for the mechanism.

The variable resistance is part of a network adapted to balance a constant voltage $V_c$ against an unknown and variable voltage $V_x$ as in servo-mechanisms generally. Thus the constant voltage $V_c$ is applied across a fixed resistor 116, which is in a series circuit with another fixed resistor 117 and the variable resistor 115. The variable voltage $V_x$ is applied across the input of an electronic power amplifier 118 in series with the fixed resistor 117.

The output of this amplifier is connected to the primary of a transformer 119. A variable oscillator 120 is connected to the primary of another transformer 121 and the secondaries of the two transformers are connected in series with the amplifier coil of the motor.

The circuit including the two voltage sources $V_c$ and $V_x$ and the resistance network is a subtractive one in which the input to the amplifier represents any difference between these two voltages which has not been compensated for by appropriate movement of the slider of the variable resistance. This difference, if any, is applied through the power amplifier and the transformer 119 to the amplifier coil at the same frequency as the main excitation current, the dynamic lubrication effect being achieved by superimposing a current of a different frequency, either slightly greater or slightly less, than that from the transformer 119. The motor seeks to move the slider of the variable resistance to a position of balance, i. e. in which no voltage is applied to the amplifier, so that the system is at rest. The off-frequency current applied to the amplifier coil causes the armature to wobble slightly at all times, so that when movement to a new position of balance is dictated by a change in $V_x$, there is no starting friction to overcome. This increases the sensitivity of the servo-mechanism to a marked degree.

Figure 1:
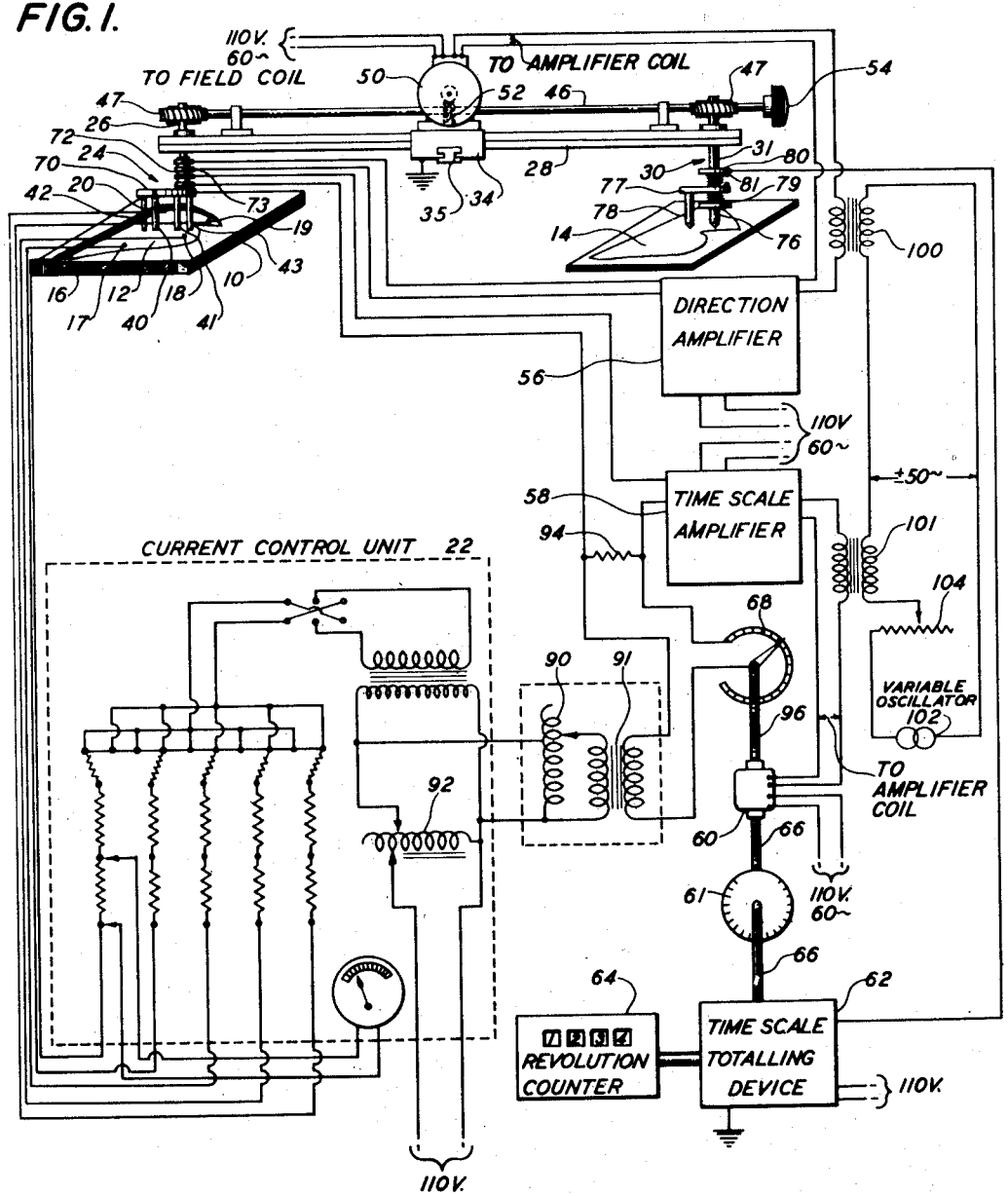
Fig. 1 is a diagram of an apparatus employed for analysis of a potentiometric model and illustrates one means of accomplishing dynamic lubrication of the linkage according to the invention.

Referring to Fig. 1 of the drawing, a reduced scale model 10 of a wet gas field is constructed with a conducting pool 12 which corresponds to the geometry of the formation or field as defined by an isopachous map or chart 14. Electrodes 16, 17, 18, 19 corresponding to extraction wells, and an electrode 20, corresponding to an injection well, project into the pool from the bottom and receive current from a current control unit 22.

A probe head 24 is supported above the pool and is mounted to rotate on a vertical shaft 26 journalled to one end of a horizontal arm or longitudinal slider 28. The opposite end of the arm carries a marker head 30 likewise rotatable on a vertical shaft 31. The chart or map 14, corresponding to the model in position and orientation, is disposed below the marker head. The arm 28 is slidable longitudinally in a holder or lateral slider 34 which travels on a horizontal supporting rail 35 lying at right angles to the arm. The holder slides along the rail, so that the probe head may be moved to any portion of the pool with the marker head occupying a corresponding position above the chart.

The exploring probe 24 is provided with two equipotential probing electrodes 40, 41 and two current flow line probing electrodes 42, 43.

The exploring probe 24 and the marking device 31, journalled in opposite ends of the arm 28, are also connected together by means of a shaft 46 and worm and pinion gears 47 so that rotational movement of the mapping device about its vertical axis 31 corresponds to rotational movement of the probe about its vertical shaft 26. A phase-sensitive induction motor 50, mounted on the sliding member 34, is geared to the shaft 46 by means of a worm gear 52 to provide means for rotating the exploring probe and the mapping device under automatic mapping conditions. A manually operated knob 54 is also provided on one end of the shaft 46 to permit rotation of the shaft when the motor 50 is disengaged.

A direction amplifier 56, a time-scale amplifier 58, a phase-sensitive induction motor 60 which operates a calibrated time-scale dial 61, a time-scale totaling device 62 and a revolution counter 64 (all of which are employed for automatic operation of the instrument) are contained within a cabinet (not shown). The time-scale dial 61 is calibrated in time-units representative of the reciprocal of the voltage drop across the current flow line electrodes 42, 43. A shaft 66 of the dial 61 is an extension of the shaft of a rheostat 68. This rheostat forms a part of a balancing circuit so designed that for a reasonable range of voltage between the flow line electrodes 42, 43 the movement of the sliding arm of the rheostat required for achieving balance is very nearly proportional to the change in the reciprocal of the voltage differential between the electrodes 42, 43. This particular type of construction is adapted for the study of systems such as a recycled wet gas field wherein the time factor, i. e. the reciprocal of the voltage differential between the flow line electrodes is of importance in mapping the movement of fluid interfaces.

In the study of electrical systems the voltage differential itself is of greater importance than the time factor. In the study of such electrical systems, therefore, the apparatus may be modified so that the time-scale dial will read directly in terms of voltage difference rather than in the reciprocal time factors. Alternatively the identical apparatus may be employed and the reading of the time-scale dial 61 corrected mathematically to give potential gradient rather than time values.

The detailed construction of the exploring probe is as follows: The vertical shaft 26 is supported from the cross member 28 as above described. An exploring foot 70, affixed to the lower end of the shaft comprises an insulating block in which four tungsten rods, constituting the probing electrodes 40, 41, 42, 43, are mounted. These electrodes are preferably disposed at the four corners of a rhombus, the so-called equipotential electrodes 40, 41 lying on one diagonal and the so-called fluid flow line electrodes 42, 43 lying on the other diagonal. The axis of the current flow line electrode 43 is the same as the axis of the vertical shaft 26, so that upon rotation of the exploring probe 24 the other probing electrodes move in circular paths around the electrode 43. Wires (not shown) attached to the tops of the four probing electrodes are connected respectively to slip rings 72. Brushes 73 contacting the slip rings are provided in order that electrical connections may be made to the probing electrodes without danger of tangling and breaking the connecting wires.

The lower end of the shaft 31 of the mapping device 30 forms a blunted or ball-shaped tracing point 76 which slides easily over the surface of the map. A cross member 77 is slidably connected on the lower portion of the shaft 31 so as to permit vertical movement therebetween. This portion of the shaft 31 is grooved to receive a lug or key (not shown) on the cross member 77. This key prevents rotation of the cross member with respect to the shaft 31. The other end of the cross member 77 supports a sharp tracing point 78. A spring 79 maintains the tip of this tracing point slightly above the surface of the map. A spring type push button switch 80 positioned on the shaft 31 is provided to push the sharp tip of the tracing point 78 into the surface of the map during the operation of the apparatus and at the same time make an electrical connection at its contact point 81 for operation of the time-scale totaling device 62.

Current is supplied to the fixed electrodes in the basin by means of a current control unit 22 described in detail in the aforementioned copending application Serial No. 791,796, filed December 15, 1947. By means of the control unit 22 the phase of the current flowing through any fixed electrode may be selected, and an electrode may be made to represent either an injection or an extraction well.

The current flow line electrodes 42, 43 are connected to a time-scale balancing circuit so that the voltage differential across these electrodes is in opposition to a fraction of a standard voltage supplied by an autotransformer 90 and a transformer 91. The input side of the autotransformer 90 is connected to the output side of the autotransformer 92, which regulates the voltage supply in the current control unit 22. By using the voltage supplied by the current control unit as a source of the standard current, the current supplied to the fixed electrodes of the model may be adjusted to a convenient level without affecting the relativity of time-scale values obtained as readings on the calibrated time-scale 61.

The time-scale balancing circuit includes the fixed resistance 94 and the variable resistance or rheostat 68. The fraction of standard voltage applied across the resistance 94 in opposition to the voltage across the electrodes 42, 43 is adjusted by means of the rheostat 68. This fraction of standard voltage across the resistance 94 is applied to the time-scale amplifier 58. The output of the amplifier supplies power to the amplifier coil of the induction motor 60 through an impedance matching transformer contained in the amplifier. A shaft 96 connects the sliding arm of the rheostat 68 with the shaft of the motor 60, so that rotation of the motor determines the amount of resistance placed in the balancing circuit by the rheostat. If the fraction of the standard voltage opposing the voltage difference across the electrodes 42, 43 is not exactly equal to this voltage difference, this inequality is applied to the amplifier 56 and the amplifier signal in turn operates the motor 60 in a direction tending to reduce the inequality in voltages. Thus the sliding arm of the rheostat 68 is moved to a position which places in the balancing circuit the exact resistance required for voltage balance.

As above described, the calibrated time-scale dial 61 is mounted on the shaft 66 (which in turn is connected to the shaft of the motor 60) so that the dial rotates simultaneously in accordance with the sliding arm of the rheostat 68, thereby indicating an arbitrary time unit in the position of that sliding arm.

The exploring probe 24 is made to automatically seek points of equal potential for the equipotential electrodes 40, 41 by means of the direction amplifier 56 which detects and amplifies any voltage difference existing between these equipotential electrodes. The output of the amplifier is applied to the amplifier coil windings of the phase-sensitive induction motor 50 through an impedance matching transformer contained in the amplifier. Energization of the field windings is obtained by a 110 volt, 60 cycle power supply and excitation of the two separate amplifier coils is obtained by the output of the direction amplifier 56. When the amplifier coils are connected in series the direction of rotation of the motor depends upon the relationship of the phase of the current in the main exciting field and in the amplifier coils. If a difference in potential exists between the equipotential probing electrodes, this potential difference is amplified and applied to the amplifier coils of the motor. As a result the armature of the motor rotates, transmitting this rotation to the member 46, the probe 24, and the marking device 30 to reduce the difference in potential between the equipotential electrodes. When an equipotential state is reached no signal is applied to the amplifier and in the apparatus (thus far described) no excitation is applied to the amplifier coil, so that no further excitation of the motor takes place.

To this point the apparatus of Figs. 1 and 2 is similar to that described and illustrated in the aforementioned copending application Serial No. 791,796, filed December 15, 1947. It is evident that when the equipotential electrodes 40, 41 are at points of equal potential there will be no excitation of the amplifier coils of the motor 50 and that the motor will be motionless. Similarly when the time-scale circuit is in balance, there will be no excitation of the amplifier coils of the motor 60 and that motor will be motionless.

As indicated above, induction motors of this type exhibit a high starting friction which has been found to not only impede the operation of the apparatus but to substantially affect the sensitivity thereof. I have found that by superimposing a current of a frequency differing from that applied to the amplifier coils of the respective motor by the direction or time-scale amplifier, the effects of the starting friction are substantially eliminated. The effect of this superimposed current is to continually excite the amplifier coils of the motor and thus keep the equipotential probes and the balancing circuit connected to the current flow line probes in continual but slight agitation. This continual agitation in turn is reflected in a voltage differential between the equipotential probes which differential is amplified by the direction amplifier and applied to the amplifier coils together with the superimposed current. Similarly the continual agitation serves to keep the balancing circuit in slight agitation back and forth across the average or the balanced state. It has been found that the sensitivity of presently employed apparatus is increased about 100% by the use of this dynamic lubrication of the invention.

One method of applying this dynamic lubrication by superposition of an exciting current to the induction motor is illustrated in Fig. 1. In this method a transformer 100 is inserted in the line between the direction amplifier 56 and the amplifier coil of the motor 50 and a second transformer 101 is inserted in the line between the time-scale amplifier 58 and the amplifier coil of the motor 60. The primaries of these two transformers are connected in series with a variable oscillator 102 through a variable resistance 104. The oscillator is adjusted to produce a current having a frequency slightly less than the line frequency, say 50 or 55 cycles, as compared to a line frequency of 60 cycles. The effect of the superposition of the off-frequency current by means of the variable oscillator and the transformers 100 and 101 has been described above.

Another means of accomplishing this dynamic lubrication is illustrated in Fig. 2, those parts which are common to Figs. 1 and 2 being indicated by the same reference characters.

In the apparatus of Fig. 2 a variable oscillator 106 is employed to feed an off-frequency current into both the direction amplifier 56 and the time-scale amplifier 58. Here again the off-frequency current may be slightly less than the frequency of the line current, say 50 or 55, as compared to a line frequency of 60 cycles. Although the effects accomplished by the apparatus of Fig. 2 are identical with those obtained with the apparatus of Fig. 1, the latter is preferred for reasons of simplicity of construction.

The effect of the superposition of the off-frequency current in amplifier coils of the induction motors is shown in Fig. 3 which is a graphical representation of the current flow to the amplifier coils. Due to the difference in time at which the 50 cycle waves and the 60 cycle waves reach maximum, the motor is caused to "shimmy" back and forth across the balance position. Thus, each time the condition indicated by A in Fig. 3 is reached, the motor will reverse. Point A is one at which the two waves are effectively in "quadrature," i. e. 90° out of phase, if one regards both waves as of the same frequency.

The oscillator frequency may also be just slightly higher than 60 cycles per second. In either case the magnitude of the off-frequency signal is kept so small that it produces only a barely perceptible motion of the system. If friction is not too great such a mechanical linkage will have a natural period of oscillations, the frequency of this oscillation being determined by the mechanical inertia of the mechanical system and the restoring force (gain) of the amplifier. In a system, such as here described, which has more than one independent linkage, the separate linkages will rarely have the same natural period. I have found it desirable to avoid using an oscillator frequency which results in a dynamic lubricating signal near the natural frequency of this system. Otherwise the natural tendency of such a linkage to hunt is aggravated seriously. Thus the oscillator frequency, the sum of, or the difference between power line frequency and oscillator frequency should avoid the natural frequency of the system. It may thus be desirable to use a separate oscillator for each independent mechanical system since an oscillator which satisfies the above conditions for one system may violate the conditions for the other.

Various designs are, of course, possible for the potential balancing circuit and the direction and time-scale amplifiers as well as in the probe and other elements of the apparatus. Moreover, it is not essential that the dynamic lubrication system of the invention be employed on both of the induction motors of the apparatus, and either one could be so operated independently of the other. Thus, it may be desirable to operate the probe manually by the means described, and to carry on the operation of the time-scale balancing circuit automatically by means of the induction motor 60. Alternatively, the location of the probe may be carried out automatically by means of the induction motor 50 and the direction amplifier 56 while the time-scale balancing unit is adjusted manually. Many such modifications may occur to those skilled in the art without departing from the scope of the invention as described and claimed.

I claim:

1. In apparatus including an exploring probe movable above a pool of electrolyte and having a plurality of probing electrodes projecting into the pool, a balancing circuit connected to two of the probing electrodes, the balancing circuit comprising a source of standard voltage connected in opposition to a voltage differential across the probing electrodes, a fixed resistance, a variable resistance adjustable to balance the standard voltage across the fixed resistance with the voltage differential between the electrodes, and an amplifier connected so as to amplify the current flow in the circuit when the voltages are not balanced, the combination which comprises an induction motor mechanically linked to the variable resistance and provided with amplifier coils, the amplifier coils of the motor being connected to the output of the amplifier to receive alternating current therefrom so that current flow to the amplifier will actuate the motor which will in turn vary the variable resistance in the direction of balance, and means for superposing current of different frequency on the current supplied to the amplifier coil by the amplifier.

2. Apparatus according to claim 1 wherein the means for superposing the current of different frequency on the current from the amplifier comprises in combination a transformer, a variable oscillator and a variable resistance, the secondary of the transformer being connected in the amplifier output, and the primary of the transformer being connected in series with the variable oscillator through the variable resistance.

3. Apparatus according to claim 1 wherein the means for superposing the current of different frequency on the current from the amplifier comprises a variable oscillator connected to the amplifier to feed the superposed current directly to the amplifier.

4. In apparatus including an exploring probe movable above a pool of electrolyte and having two pairs of probing electrodes projecting into the pool, the combination which comprises an amplifier connected across one pair of the probing electrodes, a first induction motor mechanically linked to the exploring probe so as to control rotation thereof in the plane of the surface of the pool and having amplifier coils connected to the output of the amplifier, a balancing circuit connected to the second pair of probing electrodes, the balancing circuit comprising a source of standard voltage connected in opposition to the voltage differential across the second pair of electrodes, a fixed resistance, a variable resistance adjustable to balance the standard voltage across the fixed resistance with the voltage differential between the electrodes, a second amplifier connected so as to amplify the current flow in the balancing circuit when the voltages are not balanced, a second induction motor mechanically linked to the variable resistance and having amplifier coils connected to the output of the second amplifier so that current flow to the amplifier will actuate the motor and means for superposing on the current supplied to the amplifier coils of each of the motors a current having a frequency different from the currents supplied by the amplifiers.

5. Apparatus according to claim 4 wherein the means for superposing said current comprises in combination a pair of transformers, a variable oscillator, and a variable resistance, the secondary of one of the transformers being connected in the output of the first amplifier, the secondary of the other transformer being connected in the output of the second amplifier and the primaries of the two transformers being connected in series to each other and to the variable oscillator through the variable resistance.

6. Apparatus according to claim 4 wherein the means for superposing the current on the current to each of the first and second motors comprises a single variable oscillator connected to each of the first and second amplifiers to feed the superposed current directly to the amplifiers.

7. In apparatus including an exploring probe movable above a pool of electrolyte and having a plurality of probing electrodes protruding into the pool and an amplifier connected across two of the probing electrodes, the combination which comprises an induction motor mechanically linked to the exploring probe so as to control the exploration thereof and having amplifier coils connected to the output of the amplifier, a transformer, a variable oscillator and a variable resistance, the secondary of the transformer being connected in the amplifier output and the primary of the transformer being connected in series with the variable oscillator through the variable resistance, the variable oscillator, transformer and variable resistance being adapted to superpose a current on the current supplied to the amplifier coil by the amplifier, the superposed current being of different frequency than than that supplied by the amplifier.

8. In a servo mechanism system having an alternating current motor of the induction type provided with an armature and a compensating means connected to the armature which may be driven in either direction to a null position thereby balancing the system, the combination which comprises a main field coil in the motor and means for exciting the main field coil with current of a first frequency, an amplifier coil in the motor, a first transformer, an amplifier having its output connected to the amplifier coil through the first transformer and supplying to the amplifier coil a current of the first frequency, a circuit for applying to the input of the amplifier a signal voltage of the unbalanced system, a second circuit for balancing including a variable impedance mechanically linked to the armature for balancing a constant voltage against the signal voltage, a second transformer having its secondary connected between the first transformer and the amplifier coil, and an oscillator connected to the primary of the second transformer and supplying thereto a current of a second frequency.

BURTON D. LEE.

REFERENCES CITED

The following references are of record in the file of this patent:

UNITED STATES PATENTS

| Number | Name | Date |
|---|---|---|
| 1,921,983 | Wittkuhns | Aug. 8, 1933 |
| 1,959,803 | Wittkuhns | May 22, 1934 |
| 1,959,804 | Wittkuhns et al. | May 22, 1934 |
| 2,306,479 | Jones | Dec. 29, 1942 |